United States Patent
Custeau-Boisclair et al.

(10) Patent No.: US 12,133,824 B2
(45) Date of Patent: Nov. 5, 2024

(54) LOCKING ARRANGEMENT FOR PATIENT LIFT

(71) Applicant: Arjo IP Holding Aktiebolag, Malmo (SE)

(72) Inventors: Olivier Custeau-Boisclair, Sherbrooke (CA); Ilyes Maamri, Sherbrooke (CA); Joël Bossé, Sherbrooke (CA); Mathieu Lussier, Drummondville (CA); Jocelyn Patry, Sherbrooke (CA)

(73) Assignee: Arjo IP Holding Aktiebolag, Malmö (SE)

( * ) Notice: Subject to any disclaimer, the term of this patent is extended or adjusted under 35 U.S.C. 154(b) by 447 days.

(21) Appl. No.: 17/763,795

(22) PCT Filed: Sep. 14, 2020

(86) PCT No.: PCT/EP2020/075618
§ 371 (c)(1),
(2) Date: Mar. 25, 2022

(87) PCT Pub. No.: WO2021/058308
PCT Pub. Date: Apr. 1, 2021

(65) Prior Publication Data
US 2022/0339049 A1 Oct. 27, 2022

(30) Foreign Application Priority Data
Sep. 26, 2019 (SE) .................... 1951088-2

(51) Int. Cl.
*A61G 7/10* (2006.01)
*F16D 63/00* (2006.01)
*F16D 121/32* (2012.01)
*F16D 127/06* (2012.01)

(52) U.S. Cl.
CPC ......... *A61G 7/1063* (2013.01); *A61G 7/1042* (2013.01); *F16D 63/006* (2013.01); *F16D 2121/32* (2013.01); *F16D 2127/06* (2013.01)

(58) Field of Classification Search
CPC .. A61G 7/1063; A61G 7/1042; F16D 63/006; F16D 2121/32; F16D 2127/06
See application file for complete search history.

(56) References Cited

U.S. PATENT DOCUMENTS

| | | | |
|---|---|---|---|
| 2013/0038263 A1* | 2/2013 | Faucher | B66C 15/00 318/434 |
| 2017/0001834 A1 | 1/2017 | Struder et al. | |
| 2020/0113759 A1* | 4/2020 | Waskowicz | A61G 5/14 |

FOREIGN PATENT DOCUMENTS

WO      2013120981 A1      8/2013

* cited by examiner

*Primary Examiner* — Zoheb S Imtiaz
(74) *Attorney, Agent, or Firm* — The Webb Law Firm

(57) ABSTRACT

A locking arrangement for a patient lift configured to selectively lock the vertical movement of a patient support mounting device connected to a lifting device of the patient lift via a load bearing member. The locking arrangement including a shape memory alloy element and a locking device. The shape memory alloy element is connected to the locking device and arranged to selectively actuate the locking device to control a locking force on an engagement member mechanically connected to a motor and the load bearing member of the patient lift. The present invention further relates to a patient lift including the locking arrangement.

25 Claims, 9 Drawing Sheets

LOCKING ARRANGEMENT FOR PATIENT LIFT

CROSS-REFERENCE TO RELATED APPLICATIONS

This application is the United States national phase of International Application No. PCT/EP2020/075618 filed Sep. 14, 2020, and claims priority to Swedish Patent Application No. 1951088-2 filed Sep. 26, 2019, the disclosures of which are hereby incorporated by reference in their entirety.

BACKGROUND OF THE INVENTION

Field of the Invention

The present invention relates to a locking arrangement for a patient lift. The present invention further relates to a patient lift comprising such a locking arrangement.

Description of Related Art

Patient lifts, also referred to as patient hoists, are commonly used to raise, lower and transfer patients who are disabled or who otherwise have mobility problems. Two common types of patient lifts are stanchion-mounted lifts, also known as floor lifts, and ceiling lifts. Floor lifts often have a hoist assembly which may be disposed at the upper end of a stanchion. The stanchion has a wheeled base, which allows for the lift to be moved along the ground to different locations.

A lifting member which may be in the form of a spreader bar, such as a two-point attachment spreader bar, a three-point attachment spreader bar, a four-point attachment spreader bar, a five-point attachment spreader bar or a powered spreader bar for adjusting the angle of the spreader bar, for supporting a patient harness or sling descends from the hoist assembly on a strap or a cable. The strap or cable is wound around a motorized drum for raising and lowering the patient harness or sling.

For example, the lift might be wheeled to position the hoist assembly and lifting member over or adjacent to a patient. The lifting member may then be lowered to receive the patient and subsequently raise the lifting member and patient so that they may be wheeled elsewhere to be lowered and placed. A ceiling lift may be utilized in a similar manner, however the hoist assembly is movably engaged to ceiling-mounted tracks such that the hoist assembly can be moved about the track from location to location.

A ceiling lift may be described as a motor unit movable along a rail, a flexible member is attached to a spreader bar. The motor unit commonly comprises a transmission, batteries and a control module.

The transmission is subjected to a number of challenges. For example, the transmission needs to be able to lift a patient, maintain the patient at a prescribed height for a certain period of time and lower the patient. Further, the transmission needs to be able to lift and support a weight of around 450 Kg.

Manufacturers often use smaller motors able to deliver a high RPM. In order for the smaller motors to be able to support and lift higher loads, the RPM is often reduced and torque increased by means of different types of transmissions.

Transmissions are in most cases in the form of parallel transmissions in the form of standard gears and strap, pulley and planetary gears or worm gear stages. The toughest challenge for such transmissions is to allow for a locking functionality. The locking allows for the transmission to maintain a load at a fixed position even when the lift is in a powerless state. Parallel transmissions are in themselves not locking but allows for high efficiency. Thus, a mechanical brake is required to allow for the locking functionality. The mechanical brake may be applied directly on the motor shaft to reduce the required braking torque to a minimum. Such a mechanical brake may comprise a solenoid and a braking pad. The solenoid is often expensive and requires a lot of power to operate.

Worm gear transmissions are often less efficient but allows for locking up to a certain load, often around 110 to 120 Kg. Past said load, the motor has to be provided with power to give a small amount of torque to maintain the load suspended in the lift at the same height. In an emergency situation where the power is down and the patient weighs more than the certain load described above, the patient will slowly move downwards. To counteract such downward movement an electrical brake may be utilized. However, these electrical brakes are expensive and difficult to disengage in case of an emergency.

In the light of the above, there is a need for a locking or braking arrangement which is associated with a low cost and high efficiency.

SUMMARY OF THE INVENTION

According to one aspect a locking arrangement for a patient lift is provided. The locking arrangement is configured to selectively lock the vertical movement of a patient support mounting device connected to a lifting device of the patient lift via a load bearing member.

The locking arrangement comprises a shape memory alloy element and a locking device. The shape memory alloy element is connected to the locking device and arranged to selectively actuate said locking device to control a locking force on an engagement member mechanically connected to a motor and the load bearing member of the patient lift. The motor is arranged to raise and lower the patient support mounting device.

The locking arrangement is configured to operate in an engaged mode and a disengaged mode.

In the engaged mode the shape memory alloy element is in a first configuration and the locking device is in an engaged position in relation to the engagement member for exerting a locking force on the engagement member thereby preventing vertical movement of the patient support mounting device.

In the disengaged mode the shape memory alloy element is in a second configuration actuating the locking device to a disengaged position in relation to the engagement member thereby enabling vertical movement of the patient support mounting device.

According to an aspect a patient lift is provided. The patient lift comprises a lifting device, a patient support mounting device and a load bearing member. The patient support mounting device is connected to the lifting device via the load bearing member. Further, the patient lift comprises a locking arrangement according to the above.

Further objects and features of the present invention will appear from the following detailed description of embodiments of the invention.

BRIEF DESCRIPTION OF DRAWINGS

The invention will be described with reference to the accompanying drawings, in which.

DESCRIPTION OF THE INVENTION

Figure 1A:
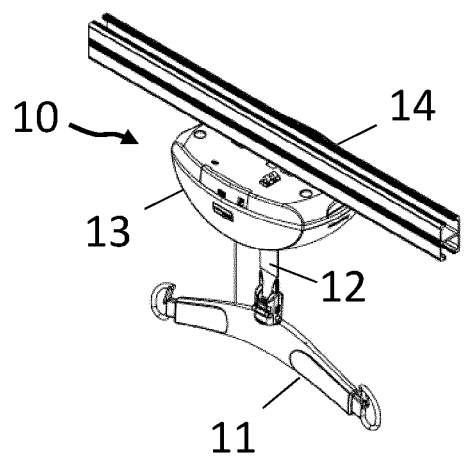
FIG. 1a is a perspective view of elements of a patient lift system.
Figure 1B:
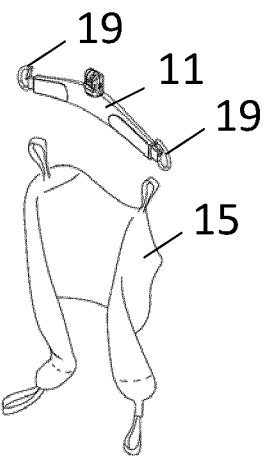
FIG. 1b is a perspective view of elements of a patient lift system.

FIGS. 1a and 1b show a non-limiting example of elements of a patient handling system with a patient lift. The patient lift may be in the form of a patient ceiling lift. A patient support mounting device 11 is connected via a load bearing member 12 to a lifting device 13 in FIG. 1a. The lifting device 13 may be arranged to be moveable along a track 14. The lifting device 13 may thus be in engagement with the track 14, e.g. movably connected to the track 14. The lifting device 13 may move along the track 14, preferably in both directions.

The lifting device 13 may be in the form of a trolley movable along said track 14.

The lifting device may comprise a drum for winding of the load bearing member 12 and motor and transmission for driving said drum. The load bearing member 12 may be wrapped around said drum for lowering and raising the patient support mounting device 11.

In one embodiment, the lifting device 13 comprises wheels for interfacing with the track 14. In one embodiment, the lifting device 13 is slidably connected to the track 14.

The patient support mounting device 11 may be a spreader bar or hanger bar. The load bearing member 12 may be a flexible member such as a strap. The patient support 15 may, as shown in FIG. 1b, be a sling.

The patient support mounting device 11 may comprise attachment elements 19 for attaching the patient support 15 to the patient support mounting device 11. The attachment elements may comprise hooks with latches.

The lifting device 13 is configured to move the patient support mounting device 11 between a raised positions situated closer to said lifting device 13 and a lowered position located more distantly from said lifting device 13. The lifting device 13 may thus be configured to move the patient support mounting device 11 vertically between said raised and lowered position.

Although the patient lift in FIGS. 1a-1b is depicted as a ceiling patient lift, the patient lift may also be floor lift with a base comprising a set of wheels for moving the lift across a floor.

FIGS. 2-13 discloses aspects of embodiments of locking arrangements for implementation in the patient lift depicted in FIG. 1.

The locking arrangement for the patient lift is configured to selectively lock the vertical movement of the patient support mounting device 11. The patient support mounting device 11 is connected to a lifting device 13 of the patient lift via the load bearing member 12.

The locking arrangement comprises a shape memory alloy element 151, 251 and a locking device 155, 250. The shape memory alloy element is connected to said locking device 155, 250 and arranged to selectively actuate said locking device 155, 250 to control a locking force on an engagement member 173, 273. The engagement member 173, 273 is mechanically connected to a motor 170, 270 and the load bearing member 12 of the patient lift, i.e. the motor 170, 270 of the patient lift and the load bearing member 12 of the patient lift. Said motor 170, 270 is arranged to raise and lower the patient support mounting device 11.

The locking arrangement is configured to operate in an engaged mode and a disengaged mode. In the engaged mode, the shape memory alloy element 151, 251 is in a first configuration and the locking device 155, 250 is in an engaged position for exerting a locking force on the engagement member 173, 273 thereby preventing vertical movement of the patient support mounting device 11.

In the disengaged mode, the shape memory alloy element 151, 251 is in a second configuration actuating the locking device 155, 250 to a disengaged position in relation to the engagement member 173, 273 thereby enabling vertical movement of the patient support mounting device 11.

Compared to known patient lifts implementing locking worm gear transmissions this allows for locking without creeping even when a large load is suspended by means of the patient support mounting device 11. Furthermore, the shape memory alloy allows for a more cost-efficient and less power consuming solution compared to a solenoid activated mechanical brake.

A shape-memory alloy is as is known in the prior art an alloy which can be deformed in a cold state but returns to a pre-deformed shape when heated. Shape-memory alloys are also known in the prior art as memory metals, memory alloys, smart metals, smart alloys or muscle wires.

The shape memory allow element 151, 251 may be in one of: Ag—Cd, Au—Cd, Co—Ni—Al, Co—Ni—Ga, Cu—

Al—Ni, Cu—Al—Ni, Cu—Al—Ni—Hf, Cu—Sn, Cu—Zn, Cu—Zn—Si, Cu—Zn—Al, Cu—Zn—Sn, Fe—Mn—Si, Fe—Pt, Mn—Cu, Ni—Fe—Ga, Ni—Ti, Ni—Ti—Hf, Ni—Ti—Pd, Ni—Mn—Ga, Ti—Nb alloy.

The shape memory alloy element 151, 251 may be a two-way memory effect element. In the first configuration, the shape memory element 151, 251 forms a shape which allows the locking device 155, 250 to in the engaged position in relation to the engagement member 173, 273. In the second configuration 151, 251 forms a shape which is arranged to force the locking device to the disengaged position in relation to the engagement member 173, 273.

The locking device 155, 250 may thus be a movable by means of the shape memory alloy element 151, 251. Accordingly, the shape memory alloy element 151, 251 may be arranged to move the locking device 155, 250 between the engaged position and disengaged position. The shape memory alloy element 151, 251 may be directly attached to the locking device 155, 250.

To allow for the locking device 155, 250 to provide the locking force, the locking device 155, 250 may be biased. Accordingly, the locking device 155, 250 may be biased to exert the locking force onto the engagement member 173, 273 and actuating the locking device 155, 250 to the engaged position when the locking arrangement operates in the engaged mode and shape memory alloy element 151, 251 is in the first configuration.

Further, the shape memory alloy element 151, 251 is arranged to actuate the locking device 155, 250 to the disengaged position in relation the engagement member 173, 273 by being in the second configuration when the locking arrangement operates in the disengaged mode. The shape memory alloy element 151, 251 thus actuates the locking device 155, 250 away from the engaged position against the locking force exerted by the biasing of the locking device 155, 250.

This is associated with the advantage of the shape memory alloy element only having to provide a disengaging force, which reduces the wear of the locking arrangement. Furthermore, biased locking device provides for a more reliant and robust locking functionality.

In an alternative embodiment however, the shape memory alloy element may be arranged to actuate the locking device 155, 250 to exert the locking force. Accordingly, in the first configuration, the shape memory element 151, 251 forms a shape which forces the locking device 155, 250 into in the engaged position in relation to the engagement member 173, 273. In the second configuration 151, 251 forms a shape which is arranged to force the locking device to the disengaged position in relation to the engagement member 173, 273.

In one embodiment, the shape memory alloy element 151, 251 is a muscle wire.

The shape memory alloy element 151, 251 may be arranged to be electrically connected to at least one power source for selectively transitioning between the first and second configuration.

The locking arrangement 100, 200 is further arranged to switch from the engaged mode to the disengaged mode by means of the shape memory alloy element 151, 251 transitioning from the first configuration to the second configuration in response to receiving a current provided by said power source exceeding a first configuration threshold current. In one embodiment, the current is provided by a single power source. In one embodiment, the current is provided by a plurality of power sources.

Each of the first and second configuration may be associated with a temperature interval. The first configuration is associated with a first temperature interval, the second configuration is associated with a second temperature interval.

The first configuration temperature interval defines a temperature interval substantially lower than the second configuration temperature interval. The first configuration threshold current is thus associated with a temperature of the shape memory alloy element 151, 251 within the second configuration temperature interval, causing the transition from the first configuration to the second configuration.

Hence, when a current is induced through the shape memory alloy element 151, 251 the temperature of the shape memory alloy element will increase causing the temperature of said shape memory alloy element 151, 251 to exceed the first configuration temperature interval and enter the second configuration temperature interval which will cause the switch from the first configuration to the second configuration. When the current is not provided the temperature of the shape memory alloy element will decrease, causing the temperature to succeed the second configuration temperature interval and enter the first configuration temperature interval which will cause the switch from the second configuration to the first configuration.

As will be described in more detail with reference to FIG. 13a-e, the current received by the shape metal alloy element may be considered a control current $I_c$. The control current $I_c$ is of a hold-level amplitude provided by the power source PS1, PS2. Hence, the shape memory alloy element 151, 251 is configured to transition from the first configuration to the second configuration in response to a hold-level amplitude $I_{320}$ exceeds the first configuration threshold current.

For example, the shape memory alloy element 151, 251 may be a muscle wire. As is known to the skilled person a muscle wire is a wire comprising a shape memory alloy which is adapted to contract in response to receiving a current. Hence the muscle wire may be adapted to contract to the second configuration, i.e. shape in response to the current exceeding the first configuration threshold current.

The locking arrangement may be arranged to switch from the disengaged mode to the engaged mode by means of the shape memory alloy element 151, transitioning from the second configuration to the first configuration in response to receiving a current provided by the power source subceeding, i.e. being smaller than, a second configuration threshold current. This includes the shape memory alloy element 151, 251 being configured to transition from the first configuration to the second configuration in response to not receiving any current from said power source. In one embodiment, the current is provided by a single power source. In one embodiment, the current is provided by a plurality of power sources.

The second threshold current is thus associated with the first configuration temperature interval. Accordingly, the second threshold currents result in the temperature of the smart metal alloy element 151, 251 cooling down, allowing for the transition from the second configuration to the first configuration.

As will be described in more detail with reference to FIG. 13a-e, considering the current received by the shape metal alloy element being the control current $I_c$. Hence, the shape memory alloy element 151, 251 is configured to transition from the second configuration to the first configuration in response to control current $I_c$ subceeding the second threshold current.

For example, if the shape memory alloy element 151, 251 is a muscle wire the muscle wire may be further adapted to expand to the first configuration, i.e. shape in response to the current subceeding the second configuration threshold current.

The power source may be electrically connected to the motor 170, 270 for driving said motor 170, 270. In one embodiment, the first configuration threshold current may be associated with an operating current range of the motor 170, 270. In one embodiment, a plurality of power sources may be electrically connected to the motor for driving said motor.

Thus, the locking arrangement is arranged to switch from the disengaged mode to the engaged mode in response to no power being provided to the motor 170, 270. The locking arrangement may thus function as an emergency brake which is actuated in response to the patient lift not being supplied with power. As soon as power is supplied to the motor 170, 270 the locking arrangement switches from the engaged mode to the disengaged mode, which allows for normal operation of the patient lift.

The power source PS1, PS2 is further arranged to provide the control current $I_c$ at a rush-level amplitude $I_{330}$ for a rush current period before providing the control current $I_c$ at the hold-level amplitude $I_{320}$. A magnitude of the rush-level amplitude $I_{330}$ being larger than a magnitude of the hold-level amplitude $I_{320}$. One or more power source PS1, PS2 may be utilized. The power source may be any type of power source known to the skilled person.

The electrical connection will be further described with reference to FIG. 13a-e. Referencing FIG. 2-12, the locking device 155, 250 may be a braking member arranged to selectively provide a braking torque to an output shaft 174, 274 of the patient lift via the engagement member 173, 273. The output shaft 174, 274 is connected to the motor 170, 270. The engagement member 173, 273 may be a friction disc or friction wheel fixed to the output shaft 174, 274.

FIG. 2-6 depicts aspects of a locking arrangement according to an embodiment.

Figure 2:
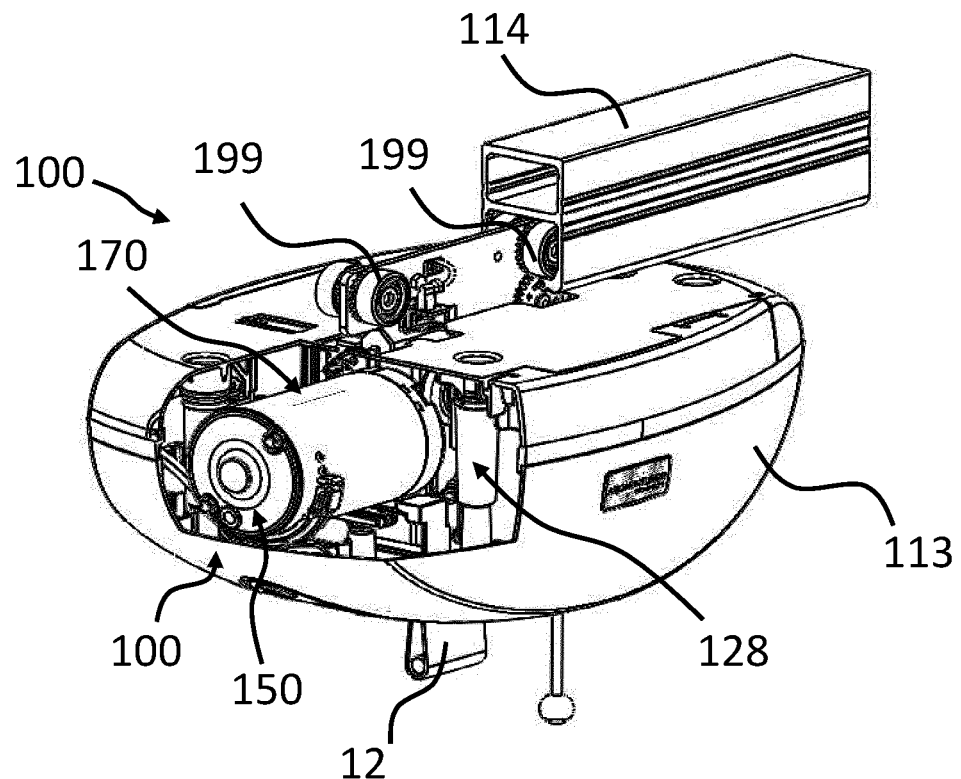
FIG. 2 depicts a locking arrangement according to an embodiment implemented in a patient lift system.

FIG. 2 depicts the locking arrangement mounted in the patient lifting device 113. The motor 170 of the patient lift is connected to the load bearing member 12 via the transmission 128. The lifting device 113 is mountable to the rail 114 by means of set wheels 199.

Figure 3:
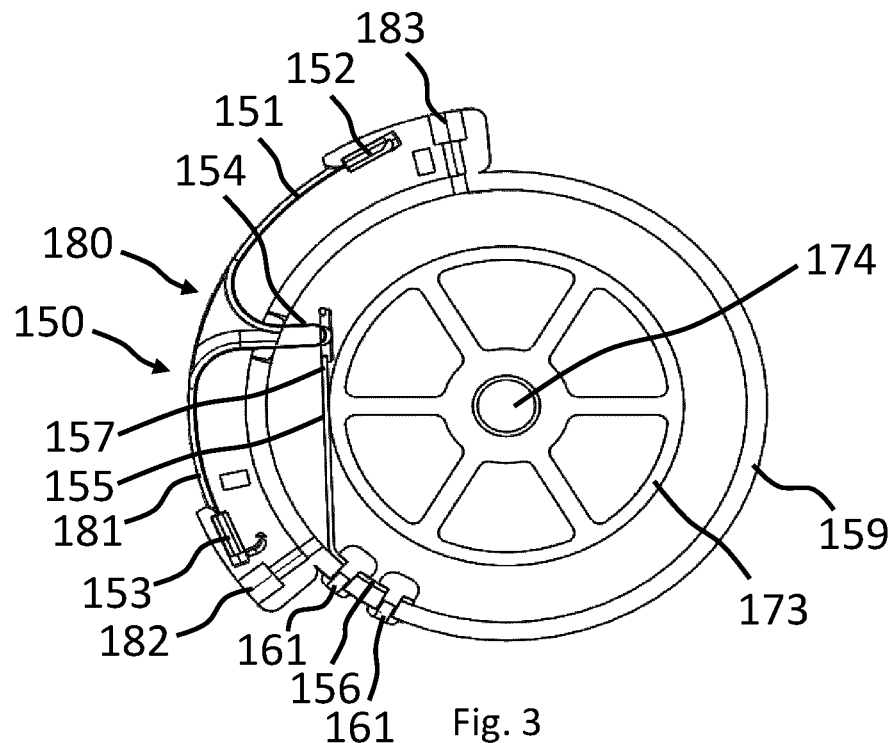
FIG. 3 is a cross-section view of a locking arrangement according to an embodiment.

FIG. 3 depicts a cross-section view of the self-locking arrangement. The locking arrangement comprises a casing 159. The casing 159 is arranged to receive the engagement member 173. In one embodiment, the engagement member 173 is a friction disc fixated to the output shaft 174.

The shape memory alloy element 151 may be configured to contract in response to a current passing through it. The contracting of the shape memory alloy element 151 pulls the locking device 155 away from engagement with the engagement member 173. Hence, the locking device 155 is arranged to disengage from the engagement member 173 by means of contraction of the shape memory alloy element 151 in response to a current exceeding the first configuration threshold current.

The casing 159 may be arranged to surround the output shaft 174. The casing 159 may be arranged to be substantially coaxial to the output shaft 174. The casing may be substantially cylindrical.

The locking device 155 may be arranged to be in braking contact with the engagement member 173 while the locking arrangement 100 operates in the engaged mode. The locking device 155 in the engaged position may form a tangent to said engagement member 173 and in the disengaged position is arranged to be in an offset angle to said engagement member 173.

The shape metal alloy element 151 is arranged to allow for the locking device 155 to be in its engaged position, wherein the locking device 155 comes into braking contact with the engagement member 173 when the locking arrangement operates in the engaged mode. The shape metal alloy element 151 may thus be arranged to expand to allow for the locking device 155 to come into braking contact with the engagement member 173 in response to receiving a current subceeding the second threshold current.

As aforementioned the locking device 155 may be biased. For example, by means of being spring-loaded. In one embodiment, the locking device 155 is in a resilient material. Said resilient material is biased to exert the locking force onto the engagement member 173 and actuating the locking device 155 to the engaged position when the locking arrangement operates in the engaged mode and the shape memory alloy element 151 is in the first configuration.

The resilient material thus causes the locking device 155 to come into braking contact with the engagement member 173 while the shape memory alloy element 151 is in the first configuration. Thus, the resilient material causes the locking device 155 to come into braking contact with the engagement member 173 when the shape memory alloy element 151 transitions from the second to the first configuration, i.e. expands.

When the shape memory alloy element 151 transitions from the first to the second configuration, the contraction of said shape memory alloy element 151 causes the locking device 155 to be moved out of braking contact with the engagement member 173. Thereby said transition counteracts the biasing force provided by resilient material of the locking device 155.

In one embodiment, the locking device 155 may comprise a friction pad arranged to come into braking contact with the engagement member 173.

Figure 4:
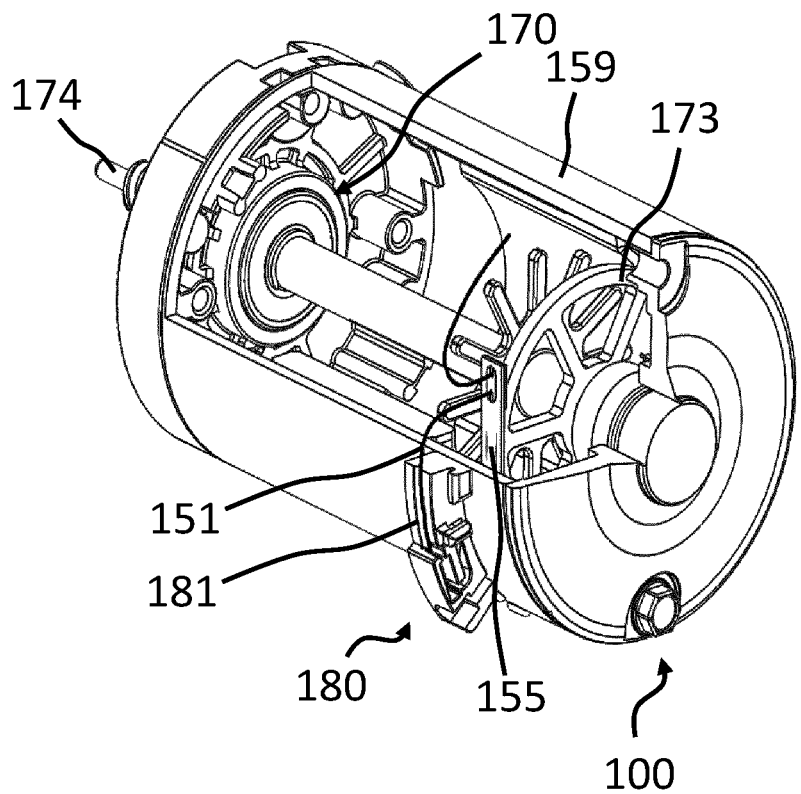
FIG. 4 is a partial longitudinal section view of a locking arrangement according to an embodiment.

Further referencing FIGS. 3 and 4, a first end portion 156 of the locking device 155 is attached to an inner surface of the casing 159. A second end portion, i.e. an opposite end portion, of the locking device 155 is attached to the shape memory alloy element 151.

The locking device 155 is arranged to move between the engaged position and the disengaged position in an angle relative a tangent of the engagement member 173. In the engaged position the locking device 155 is arranged to form a tangent to the engagement member coming into braking contact with said engagement member 173. Accordingly, the angle in relation to said tangent may be zero. In the disengaged position, the locking device 155 is inclined relative said tangent to the engagement member 173 to not be in braking contact with said engagement member 173.

In one embodiment, the first end portion 156 may be attached to the inner surface of the casing 159 by means of fastening element(s) 161.

Figure 5:
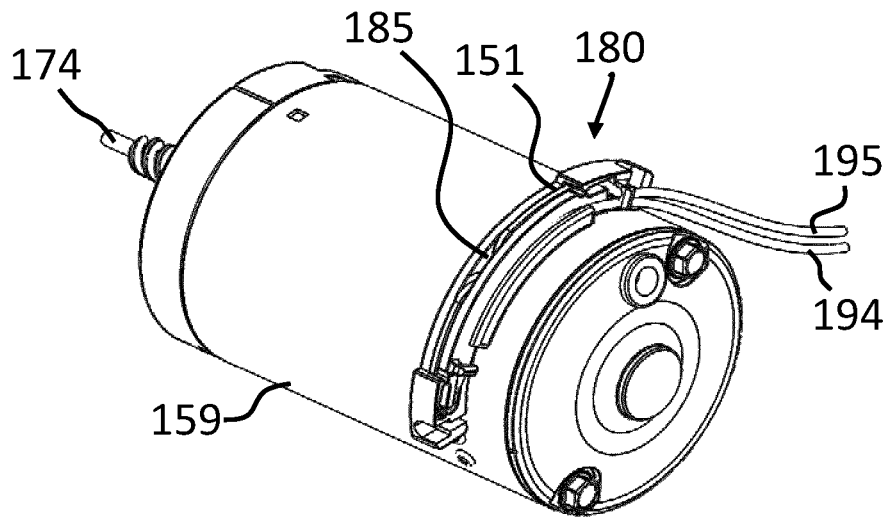
FIG. 5 is a perspective view of a locking arrangement according to an embodiment in combination with a motor.
Figure 6:
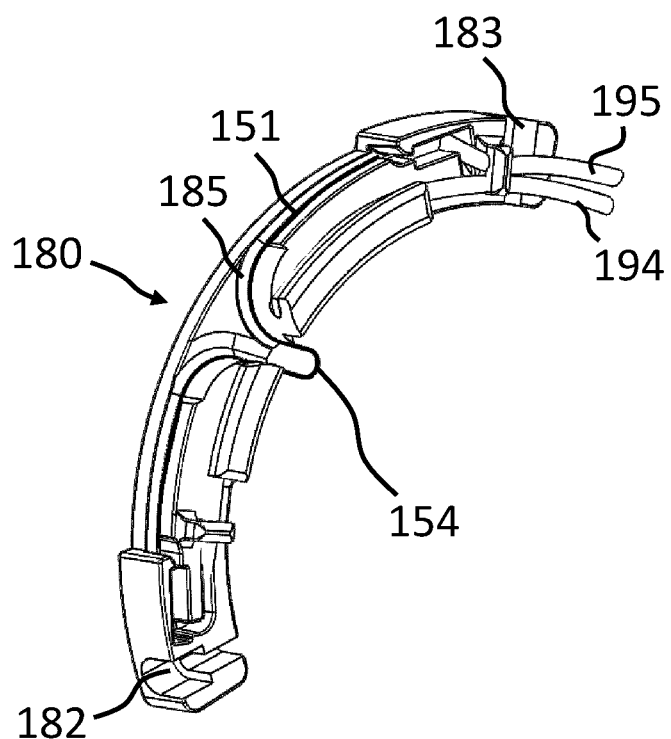
FIG. 6 is a perspective view of a subassembly in the form of a suspension arrangement of a locking arrangement according to an embodiment.
Figure 7:
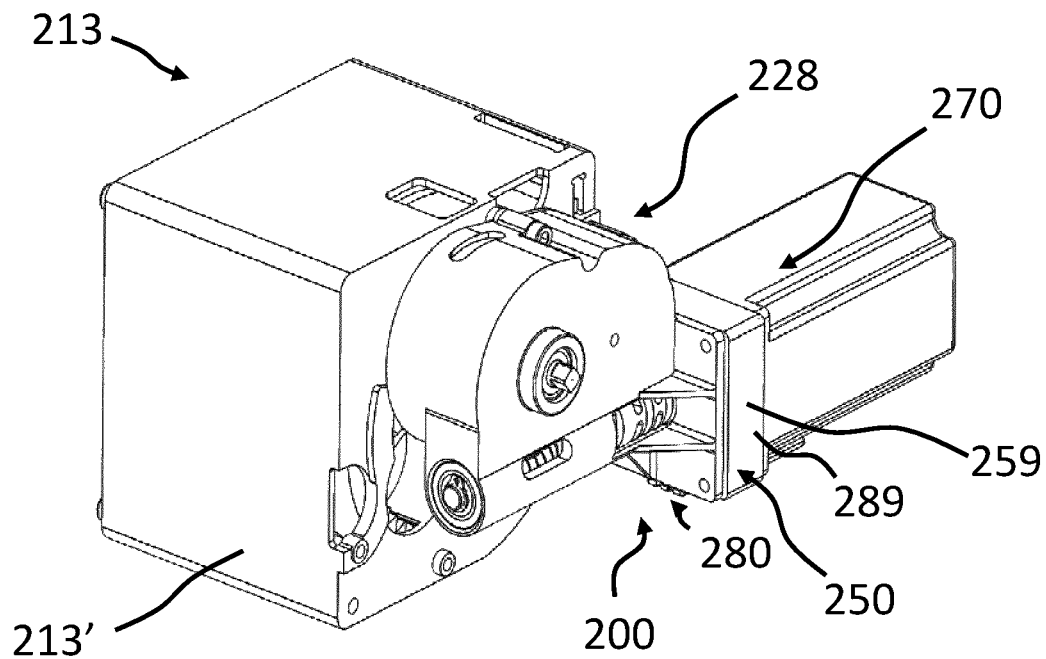
FIG. 7 is a perspective view of a locking arrangement according to an embodiment implemented in a patient lift system.
Figure 8:
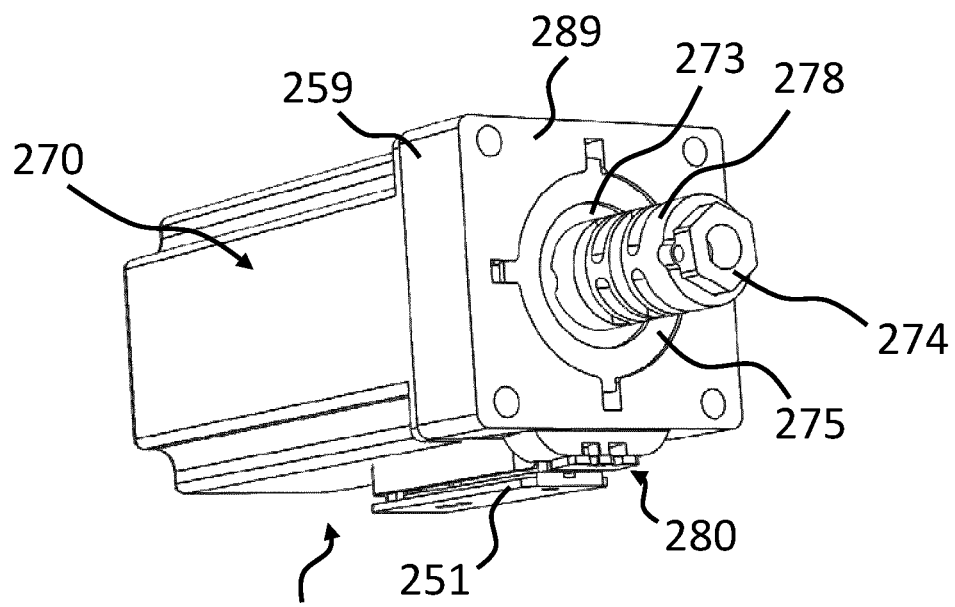
FIG. 8 is a perspective view of a locking arrangement according to an embodiment in combination with an electric motor.

As further depicted in FIG. 4-6, the shape memory alloy element 151 is arranged in a suspension arrangement 180. The suspension arrangement 180 is mounted to the casing 159. The shape memory alloy element has a first end 152 and a second, i.e. opposite, end 153. Each of the first and second ends are mounted to the suspension arrangement 180 such that the shape memory alloy element 151 is arranged to at least partially surround the engagement member 173. The shape memory alloy element 155 has an intermediate portion 154 arranged to extend inwards towards the engagement member 173. The intermediate portion 154 is connected to the locking device 155. Said intermediate portion 154 may thus be arranged to cause the movement of the locking device 155 between the engaged position and the disengaged position.

The intermediate portion 154 may be a bent portion of the shape memory alloy element 151 for example in the form a loop-shaped portion. The bent portion is arranged to extend inwardly towards the engagement member 173. The inward end of the bent portion 154 may be attached to the locking device 155. The end portion may be attached to the second end portion 157.

The suspension arrangement 180 may comprise a first and second port 153 for electrically connecting the shape memory alloy element 151 to the power source. The ports may be connected to the power source via a first and second cable 194, 195. Referencing FIGS. 4 and 5, the casing 159 may be arranged to receive the motor 170 therein. Hence, the motor 170 of the patient lift may be mounted inside the casing of the self-locking arrangement. The motor 170 and the locking arrangement may thus constitute a single motor unit which includes the locking functionality. This enables a more efficient and less complex retro-fitting of the locking arrangement to existing patient lifts.

The engagement member 173 may be directly mounted to the output shaft 174. The engagement member 173 may be in the form of a friction wheel or disc. The friction wheel may be fixed to the output shaft 174. The friction disc may be coaxial with the output shaft 174.

Referencing FIG. 4-6, the suspension arrangement may comprise a guiding channel 185 for receiving the intermediate portion 154. The guiding channel may extend along the suspension arrangement 180. A portion of said guiding channel 185 extends inwardly towards the locking device 155. The shape metal alloy element 151 extends along the walls of the guiding channel 185 inwards through the inwardly extending portion through an aperture allowing passage for said shape metal alloy element 151 towards the locking device 155. The intermediate portion 154 of the shape metal alloy element 151 extends along opposite guiding surfaces of said guiding channel 185, the intermediate portion being in contact with said guiding surfaces.

In one embodiment wherein the suspension arrangement 180 is mounted to the outside of the casing 159, the casing may comprise a through-hole for allowing passage of the intermediate portion 154.

The suspension arrangement 180 may arc shaped and arranged to be mounted to the outer cylindrical surface of the casing 159.

FIG. 9-12 depicts aspects of another embodiment of the locking arrangement. The locking arrangement 200 is arranged to mechanically connect the motor 270 and a transmission unit 228 of the patient lift 213. Thus, the locking arrangement may be arranged to transfer torque between the motor 270 and the transmission unit 228. The transmission unit 228 is arranged to transfer torque from the motor 270 to the load bearing member of the patient lift.

More specifically, the locking arrangement 200 is arranged to selectively transfer torque between said motor 270 and transmission unit 228. In the engaged mode, the locking arrangement is arranged to disable torque transfer between the motor 270 and the transmission unit 228. In the disengaged mode, the locking arrangement is arranged to enable torque transfer between the motor 270 and the transmission unit 228.

The patient lift may thus comprise the motor 270 and transmission unit 228. Said motor and transmission unit may be comprised in the lifting device.

The locking device 250 may be arranged to move between the engaged position and the disengaged position in a direction substantially parallel to the output shaft 274. Accordingly, the shape memory alloy element 251 is arranged to move the locking device 250 between the engaged position and the disengaged position in said direction substantially parallel to the output shaft 274. In response to receiving a current exceeding the first threshold current, the shape memory alloy element 251 is arranged to contract to the second configuration causing the locking device 250 to move to the disengaged position in the direction substantially parallel to the output shaft 274. In response to receiving a current subceeding the second threshold current, the shape memory alloy element 251 is arranged to expand to the first configuration causing the locking device to move to the engaged position in the direction the direction substantially parallel to the output shaft 274.

The shape memory alloy element 251 may thus be arranged parallel to the output shaft 274. In other words, the shape memory alloy element 251 may be arranged in a direction parallel to the output shaft 274. Hence, the shape memory alloy element 251 may be further arranged to contact in a direction parallel to the output shaft 274.

Figure 9:
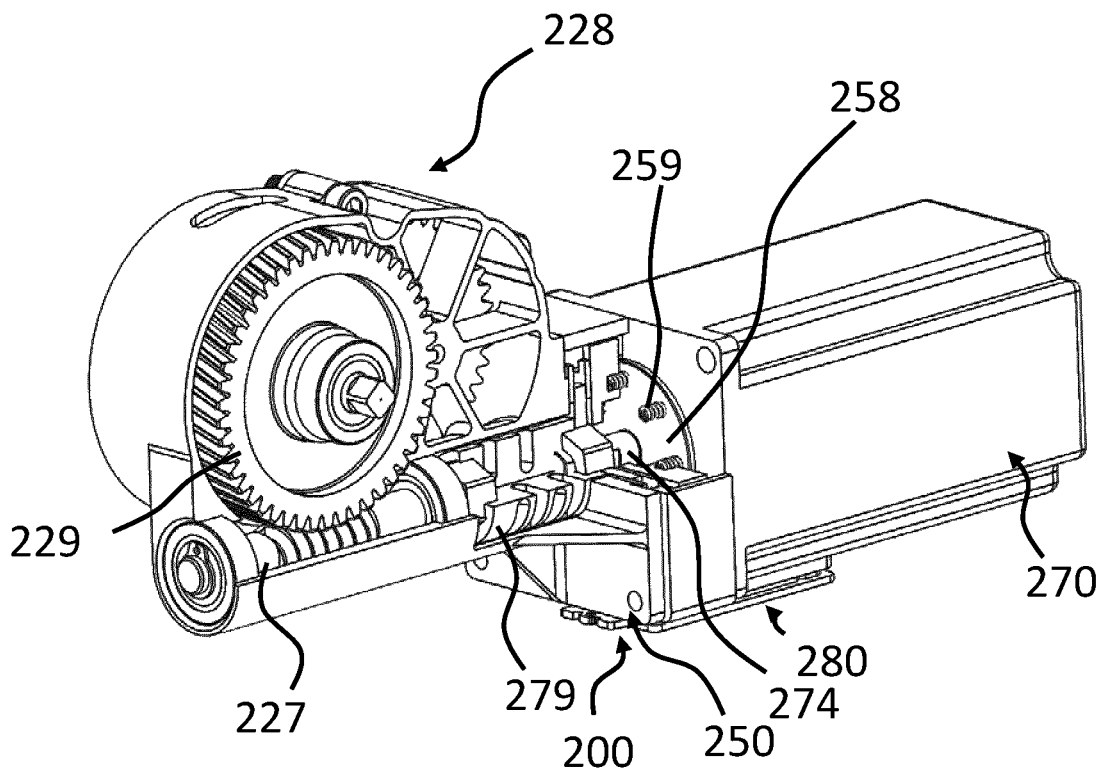
FIG. 9 is a perspective view of a locking arrangement according to an embodiment in combination with an electric motor and a gear box.

As depicted in FIG. 9, the transmission unit 228 may be a worm gear transmission. The output shaft 274 may be connected to a worm gear shaft 227. The output shaft may be interfacing with a worm gear wheel 229. The worm gear wheel may be connected to a drum or winch for raising and lowering the patient support mounting device. The load bearing member, which may be a flexible member, may be wrapped around said drum or winch.

Figure 10:
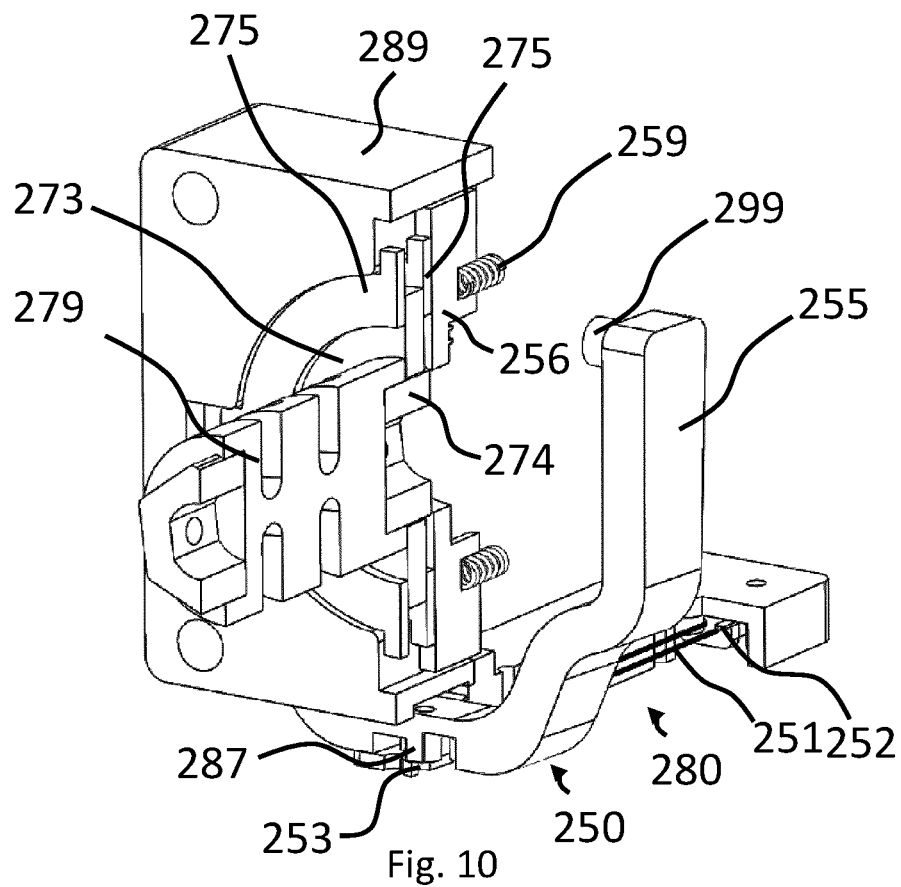
FIG. 10 is a partial longitudinal view of a locking arrangement according to an embodiment.
Figure 11:
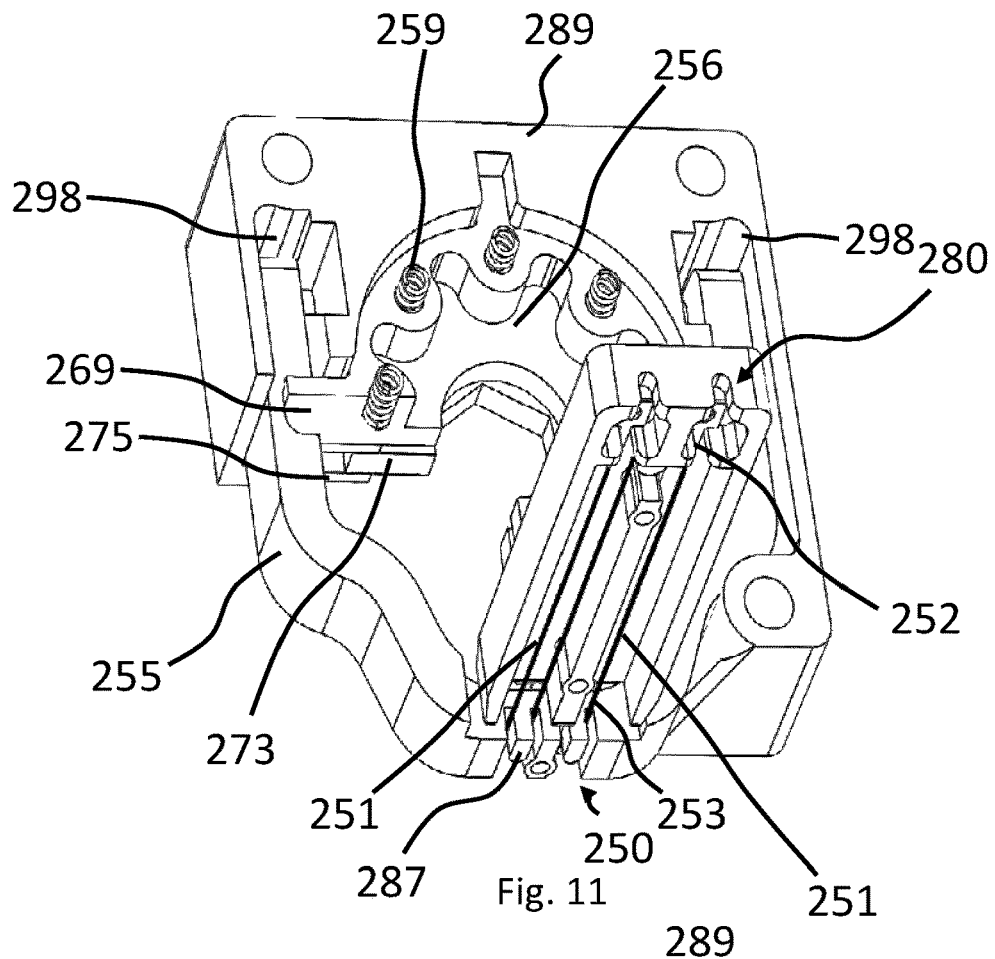
FIG. 11 is a perspective view of a locking arrangement according to an embodiment.
Figure 12:
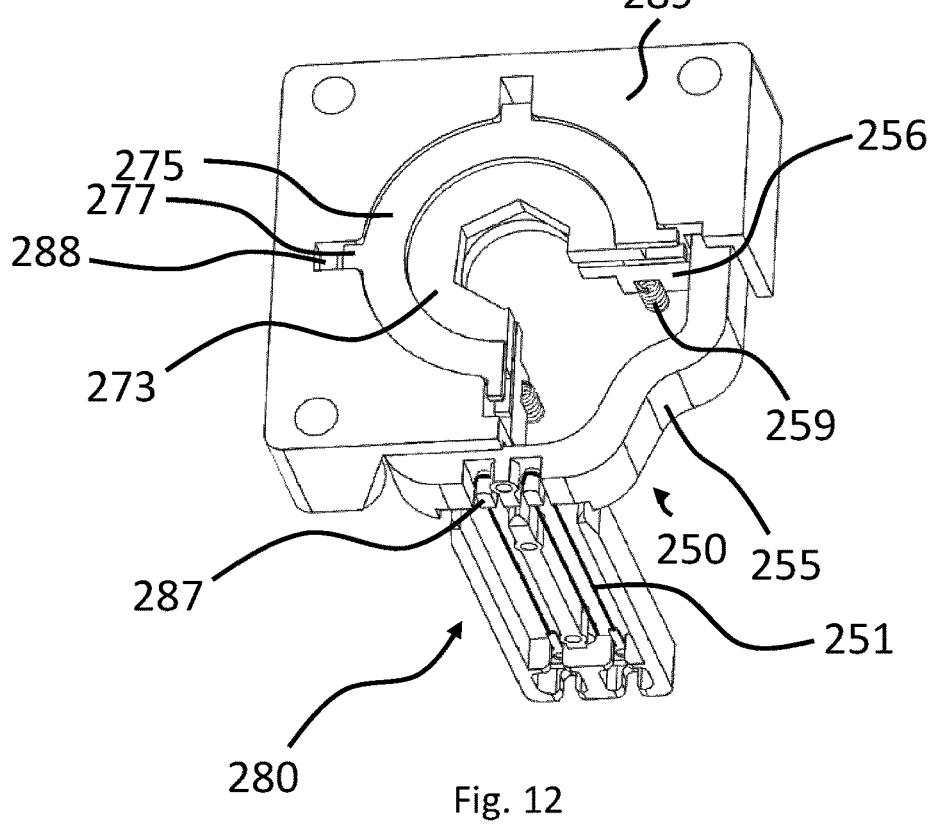
FIG. 12 is a partial cross-section view of a locking arrangement according to an embodiment.

Referencing FIG. 10-12, multiple views of the locking arrangement 200 are presented.

As most clearly depicted in FIG. 10-11, a first portion 253 of the shape memory alloy element 251 may be attached to the locking device 250. A second portion 252 of the shape memory alloy element 251 is fixed. In further detail, said first portion 253 may be attached to an actuated part 255 of the locking device 250 for moving said locking device 250. Preferably said second portion 252 may be arranged to be fixated to the motor 270, i.e. an encasing of the motor 270.

In one embodiment, the locking arrangement may comprise a plurality of shape memory alloy elements 251. The shape memory alloy elements 251 may extend parallel to each other and to the output shaft. Each shape memory alloy element may be arranged to be electrically connected to the power source.

In one embodiment, the shape memory alloy element 251 is in the form of a muscle wire. The first portion 253 of the muscle wire may be connected to the locking device 250, i.e. the actuated part 255 of the locking device 250, by means of being at least partially wrapped around one or more protrusions 287 of the locking device 250, i.e. the actuated part 255. The wrapping of the shape memory alloy element 251 may allow for a more robust connection between the shape metal alloy element and the locking device, capable of carrying a higher load. Thus, a safer and more reliable locking arrangement may be achieved.

According to above described embodiment, a first and second end of the shape memory alloy element 251 may be fixed, i.e. comprised in the second portion of the shape memory alloy element 251. The first and second end may be arranged to be electrically connected to the power source. The first and second end are fix, preferably said first and second end are arranged to be fixated to the motor 270, i.e. the encasing of the motor.

The locking arrangement may comprise a suspension console 280. The second portion 252 of the shape memory alloy element 251 is attached to the suspension console. The suspension console may comprise one or more passages arranged to receive the shape memory alloy element 251. Said passages are arranged to extend substantially parallel to the output shaft 274. Preferably the suspension console 280 may comprise ports for receiving the first and second end of the shape memory alloy element 251 and electrically connect the first and second end of the shape memory alloy element 251 to the power source. The suspension console may be mounted to the motor 270.

Further referencing FIG. 10-12, the locking arrangement 200 may further comprise a housing 289 for receiving the output shaft 274 and the engagement member 273. The locking arrangement 200 may further comprise at least one friction member 275. The at least one friction member 275 may be arranged in said housing 289. Said friction member 275 may be arranged to be in the proximity of the engagement member 273. Accordingly, the locking device 250 in the engaged position may be arranged to cause the at least one friction member 275 and the engagement member 273 to come into contact thereby providing a braking torque to the output shaft 274.

The locking device 250 may thus be arranged to in the engaged position push the engagement member 273 towards the friction member 275 and thereby provide the braking torque to the output shaft 274. In one embodiment, the locking device 250 may be provided with a friction material and arranged to directly coming into contact with the engagement member 273 in the engaged position and thereby provide braking torque to the output shaft. The friction member 275 may be movably arranged in the casing.

The friction member 275 may be arranged in a recess of the housing, said recess enabling movement of the friction member 275 substantially parallel to the direction of the output shaft 274.

In one embodiment, which is depicted in FIG. 9-12, the locking device may be biased by means of further comprising a biasing part 256. The biasing part 256 is spring loaded for exerting a locking force onto the engagement member 273. The biasing part 256 is arranged to engage the actuated part 255 for actuating the locking device 250 to the engaged position when the locking arrangement operates in the engaged mode.

Further, the biasing part 256 may be arranged to engage the actuated part 255 upon the locking device moving from the engaged position towards the disengaged position.

The biasing part 256 may comprise at least one abutment heel 269 arranged to latch onto the actuated part 255. The abutment heel 269 may provide a latching surface abutting to the actuated part 255. Upon the locking device 250 moving from the engaged position towards the disengaged position, the biasing part 256 is arranged to be pushed away from the engagement member 273 by the actuated part 255. Hence the shape metal alloy element 251 is arranged to push the biasing part 256 against the spring force exerted by said biasing part 256 upon said shape metal alloy element 251 transitioning from the first configuration to the second configuration.

Accordingly, the output shaft 274 may extend distally, whereby the first end of the shape metal alloy 251 may be a distal end of said shape metal alloy element 251. The latching surface of the abutment heel 269 may be a distal surface of the biasing part 256. Said latching surface is in abutment with a proximal surface of the actuated part 255, whereby the actuated part is arranged to push the biasing part away, i.e. in a proximal direction, from the engagement member by the proximal surface of the actuated part 255 pushing the distal surface 256 of the biasing part 256.

When the shape memory alloy element 251 transitions from the second configuration to the first configuration the biasing part reaches its locking position, i.e. the biasing part locks the engagement member 274. Thus, the expansion of the shape memory alloy element 251 causes the biasing part to push the locking device 250 to its engaged position, whereby the locking force is provided.

In an alternative embodiment the biasing part 256 may be directly connected to the actuated part 255. Thus, the biasing part 256 may be attached to the actuated 255 for example by means of fastening elements such as screws.

Compared to the fixed attachment, the embodiment implementing the abutment heel allows for the actuated part 255 and the biasing part 256 to not be completely aligned and still provide the necessary locking force, whereby the locking arrangement is less susceptible to wear and functional issues due to inaccurate tolerances. Thus, a more stable and efficient locking arrangement may be achieved. As depicted in FIG. 11, biasing part may comprise a pair of abutment heels. A first abutment heel may extend outwardly in a first direction, whereby a second abutment heel may extend outwardly in a second direction opposite to the first direction.

The housing 289 may comprise one or more locking device tracks 298 for supporting the locking device 250 along its movement between the engaged position and the disengaged position. The guided movement of the locking device provided by the locking device tracks allows for a more exact and reliable locking. Preferably said locking device tracks may be arranged to support the actuated part 255 of the locking device 250.

The locking device tracks 298 may be arranged to extend substantially parallel to the output shaft 274.

In one embodiment, the actuated part 255 is substantially U-shaped, whereby the housing 289 may comprise a first and second locking device tracks for receiving a first and second flange of said U-shaped actuated part 255.

In one embodiment, the actuated part 255 is provided with one or more wheels 299 arranged to run in said one or more locking device tracks.

Further referencing FIG. 10-12, the biasing part 256 may be connected to a fix surface by means of springs 259. Said springs may be connected to the motor 270, i.e. the encasing of the motor 270. In one embodiment, the springs may extend substantially parallel to the output shaft 274.

As depicted in FIG. 10-12, the engagement member 273 may be as earlier described in the form of a friction disc or wheel fixated to the output shaft 274. The engagement member 273 extends substantially orthogonal to the output shaft 274.

The at least one friction member 275 may be a friction washer. Said at least one friction washer may be an annular friction washer with an aperture for receiving the output shaft 274. The at least one friction member 275 is arranged to be coaxial to the engagement member 273 and the output shaft 274. The at least one friction element 275 may be coaxial to the biasing part 256. The biasing part may comprise an aperture for receiving the output shaft 274, i.e. allowing passage of the output shaft 274.

Each of the at least one friction member 275 may be movably arranged in the housing 289. Each of the at least one friction member 275 may be arranged to move along a direction substantially parallel to the output shaft 273. Hence, the biasing part 256 is arranged to push the at least one friction member 275 onto the engagement member 274 thereby locking the output shaft 274.

Said at least one friction member 275 may be provided with at least one guide element 277. The housing 289 may comprise a corresponding guide element 288. The corresponding guide element 288 is arranged to guide the at least one friction member 275 in a direction substantially parallel to the output shaft 274. As depicted in FIG. 12, the at least one guide element may be a guiding protrusion, whereby the guide element 288 may be a guiding channel extending in the housing in a direction substantially parallel to the output shaft 274. Said guiding channel is arranged to receive the guiding protrusion.

In one embodiment, the locking arrangement may comprise two friction members 275. The friction members 275 may be arranged in the recess of the housing 289 at a distance from each other for receiving the engagement member 274 there between.

Further referencing FIG. 9-12, the output shaft 274 extends distally, whereby the first friction member is a distal friction member and the second friction member is a proximal friction member. The biasing part 256 may be arranged to come into contact with the proximal friction member to push said proximal friction member to a proximal surface of the engagement member 273 when the locking device 250 is in the engaged position. Thus, the biasing part 256 pushes the proximal friction member towards the engagement member and the distal friction member thereby locking the engagement member 273.

According to an aspect a patient lift comprising the locking arrangement according to any of the embodiments described above is provided. Hence, said patient lift comprises the lifting device 13, 113, 213 the patient support mounting device 11, the load bearing member 12. The patient support mounting device 11 is connected to the lifting device 13, 113, 213 via the load bearing member 12. The patient lift further comprises the locking arrangement 100, 200 as described with reference to any of the above embodiments.

Figure 13A:
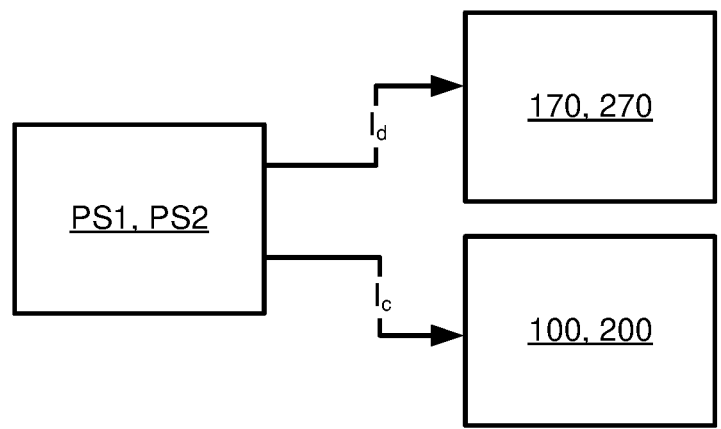
FIG. 13a is a schematic block diagram of the electrical connections of a locking arrangement according to an embodiment.
Figure 13B:
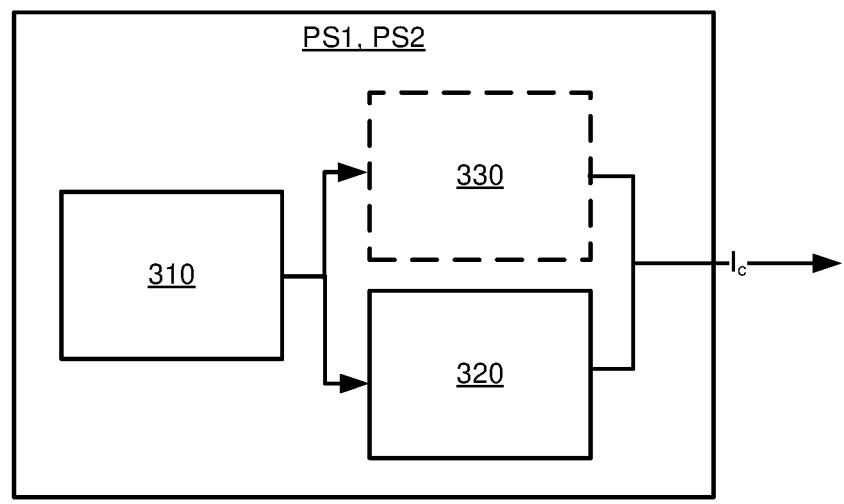
FIG. 13b is a schematic block diagram of the electrical connections of a locking arrangement according to an embodiment.

FIGS. 13a-e discloses embodiments of the circuitry for controlling the locking arrangement. With reference to FIG. 13a-b, the patient lift comprises the power source PS1, PS2. The power source PS1, PS2 is electrically connected to the motor 170, 270 for driving said motor 170, 270 by providing a drive current $I_d$ to the motor 170, 270. The first configuration threshold current may be associated with an operating current range of the motor 170, 270. The power source PS1, PS2 is also electrically connected to the shape memory alloy element 151, 251 such that the power source PS1, PS2 controls the configuration of the shape memory alloy element 151, 251 by supplying a control current $I_c$ to the shape memory alloy element 151, 251. The power source PS1, PS2 is provided with a power supply 310 which is typically connected to mains power but may in all embodiments be arranged to comprise one or more batteries suitable to supply the drive current $I_d$ to the motor 170, 270 and the control current $I_c$ to the shape memory alloy element 151, 251. Said one or more batteries may be rechargeable batteries and the power source PS1, PS2 may be provided with means for charging the battery when the power source PS1, PS2 is connected to mains power. It should be emphasized that the power source PS1, PS2 is described as providing power to both the motor 170, 270 and the shape memory alloy element 151, 251 but it can very well be seen as two separate power sources PS1, PS2 that may or may not be in communication with each other.

In one embodiment of the power source PS1, PS2, as seen in FIG. 13b, the power source PS1, PS2 comprises the power supply 310 and a current generator 320. As mentioned earlier, the power supply 310 may be a mains connection, battery or any other suitable means for providing power such as a low voltage DC or AC. The skilled person has knowledge of how to adapt different power supplies 310 to suit the power source PS1, PS2. The current generator 320 may be implemented in numerous different ways. The simplest implementation is by having the current generator connect the power source directly to the shape memory alloy element 151, 251. In such an implementation the control current $I_c$ is only limited by the impedance of the shape memory alloy element 151, 251 and the parasitic impedances of the circuitry connecting the powers source 310 to the shape memory alloy element 151, 251, this is assuming that the power source 310 itself is capable of supplying such currents. Such a current generator 320 may be problematic as it will consume a fair amount of power but it will be as quick as can be in transitioning the shape memory alloy element 151, 251 from the first configuration, engaged mode of the locking arrangement 100, 200, to the second configuration, disengaged mode of the locking arrangement 100, 200. Another implementation of the current generator may be a series passive component such as a resistor connected in series between the power supply 310 and the shape memory alloy element 151, 251. The impedance of the passive component will determine the control current $I_c$ provided to the shape memory alloy element 151, 251 in accordance with the well-known Ohms law. Other implementations of the current generator 320 are suitable off the shelf components e.g. a transistor that is controlled from the power supply 310, the NCP3066 buck/boost/inverting, Regulator, Switching, Constant Current generator from ON Semiconductor or any other current controlling means.

The shape memory alloy element 151, 251 may not be instant in its response to the control current $I_c$. In fact, the shape memory alloy element 151, 251 may be such that the time it takes to transition from the first configuration to the second configuration will depend on the control current $I_c$. An increased control current $I_c$ will result in a decreased transition time from the first configuration to the second configuration of the shape memory alloy element 151, 251. The shape memory alloy element 151, 251 typically changes configuration in response to reaching a certain temperature and the more current that is supplied to the shape memory alloy element 151, 251 the faster it will heat. With continued reference to FIG. 13b, in order to make the transition from the engaged position to the disengaged positon as fast as possible without consuming too much current, a rush current source 330 may be comprised in the power source PS1, PS2. The rush current source 330 is arranged to provide a comparably high control current $I_c$ for a limited period of time allowing the shape memory alloy element 151, 251 to transition from the engaged position to the disengaged positon before the control current $I_c$ is reduced to a comparably low level as provided by the current generator 320. One advantage of such an arrangement is that the current consumption in steady state, disengaged position, can be reduced whilst keeping the time is takes to transition from the engaged position to the disengaged position as short as possible. This is provided for by the dual current sources where the rush current generator 330 provides the control current $I_c$ for a comparably short period of time before control current $I_c$ is provided solely by the current generator 320. It should be mentioned that the both the rush current generator 330 and the current generator 320 can work in parallel during the transition from the engaged position to the disengaged position by the shape memory alloy element 151, 251.

Figure 13C:
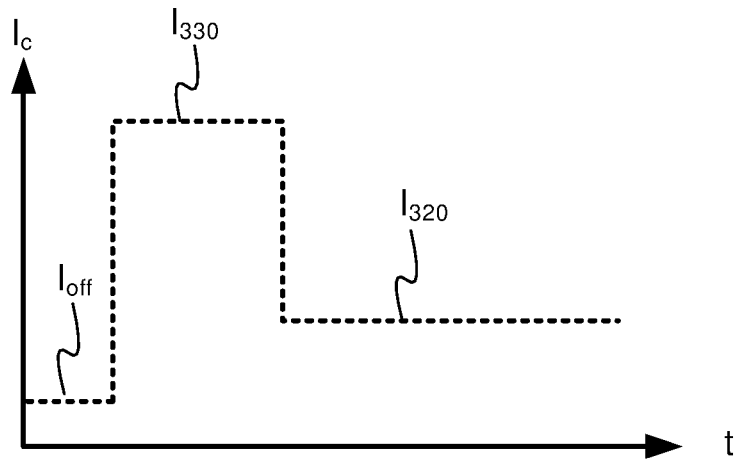
FIG. 13c is a graph depicting the amplitude of the control current of the locking-arrangement.
Figure 13D:
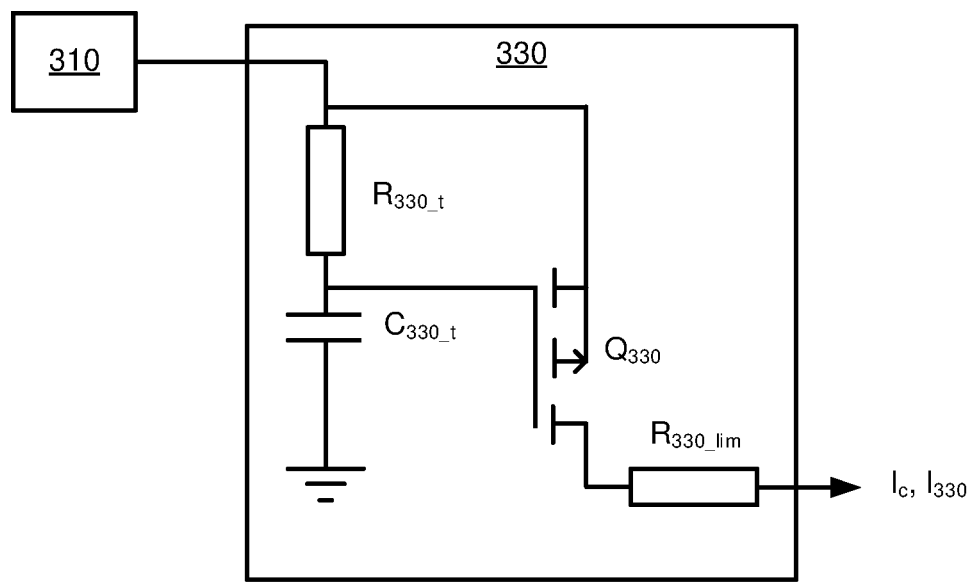
FIG. 13d is a schematic drawing of the electrical connection of a locking arrangement according to an embodiment.

In FIG. 13c, a graph of the amplitude of the control current $I_c$ is shown as over time t as a dotted line in. Initially, the control current $I_c$ is off and an at off-level amplitude $I_{off}$. At a point in time, the shape memory alloy element 151, 251 is to be transitioned from the engaged position to the disengaged positon. At that point the amplitude of the control current $I_c$ is driven to a rush-level amplitude $I_{330}$ provided by the rush current source 330. After a period of time, the rush current source 330 stops providing current and the control current $I_c$ is supplied at a hold-level amplitude $I_{320}$ supplied by the current source 320.

The rush current source 330 may be implemented in many ways. One embodiment of the rush current source 330 is shown by the simplified schematic in FIG. 13d. The control current $I_c$ is in this embodiments enabled by the activation of a rush current transistor $Q_{330}$. As power is supplied to the rush current generator by the power source 310, the rush current transistor $Q_{330}$ will connect the power source 310 to the shape memory alloy element 151, 251 via an optional rush current limiting element $R_{330\_}$lim. The rush current limiting element $R_{330\_}$lim will set the rush-level amplitude $I_{320}$ of the control current $I_c$. The control voltage of the current transistor $Q_{330}$ will gradually increase to the level of the power supply 310 as a rush timing capacitor $C_{330\_}$t is charged via a rush timing resistor $R_{330\_}$t. Once the rush timing capacitor $C_{330\_}$t is charged, the control voltage of the current transistor $Q_{330}$ will be substantially the same as a voltage provided by the power source 310 and the current transistor $Q_{330}$ will disconnect the power source 310 from the shape memory alloy element 151, 251. The duration the control current $I_c$ is supplied at the rush-level amplitude $I_{320}$ by the rush current source 330 is consequently controlled by the dimensioning of the rush timing capacitor $C_{330\_}$t and the rush timing resistor $R_{330\_}$t. The dimensioning of RC-circuitry and calculation of the corresponding time constant is well known to the skilled person.

In one embodiment, not shown, of the power supply PS1, PS2, the power supply 310, or a separate controller, provides a PWM signal to the current generator 320 and the current generator 320 provides a control current $I_c$ that is proportional to a duty cycle of the PWM signal. Such an embodiment is beneficial as it allows the current generator to directly generate a control current $I_c$ of a rush-level amplitude $I_{320}$ simply by providing it with a PWM signal of a comparably higher duty cycle compared to the duty cycle provided to the current generator when it is to provide a control current $I_c$ of hold-level amplitude $I_{320}$. The PWM signal can be controlled by software and the different amplitudes 1320, 1330 of the control current $I_c$ can be configurable. The duration the control current $I_c$ is supplied at the rush-level amplitude $I_{330}$ may in some embodiments be controlled by a control loop where a configuration sensing signal indicates the current configuration of the shape memory alloy element 151, 251. When the shape memory alloy element 151, 251 has transitioned to the second configuration, the PWM signal can change duty cycle such that a control current $I_c$ of hold-level amplitude $I_{320}$ is provided to the shape memory alloy element 151, 251. In some embodiments the duty cycle of the PWM signal is controlled by the configuration sensing signal where the control current is kept as low as possible while keeping the shape memory alloy element 151, 251 in the second configuration. This may be achieved by having the configuration sensing signal activate as soon as the shape memory alloy element 151, 251 is not in its second configuration and having the active configuration sensing signal activate the current generator 320. As soon as the shape memory alloy element 151, 251 has returned to the second configuration the configuration sensing signal is deactivated and so is the current generator 320. This process is repeated and the current configuration sensing signal will act as a PWM signal for the current generator 320. The configuration sensing signal may be implemented in one of several different ways where the simplest example may be an electromechanical switch arranged to sense the configuration of the shape memory alloy element 151, 251. Another example may be to sense a force that the shape memory alloy element 151, 251 exerts in a direction and use this to generate the configuration sensing signal. Hence, a force sensor may be operatively connected to the shape memory alloy element.

In one embodiment of the power source PS1, PS2, the duration the control current $I_c$ is supplied at the rush-level amplitude $I_{330}$ is between 50 ms and 200 ms.

In one embodiment, the hold-level amplitude $I_{320}$ is at a level of the first configuration threshold.

Figure 13E:
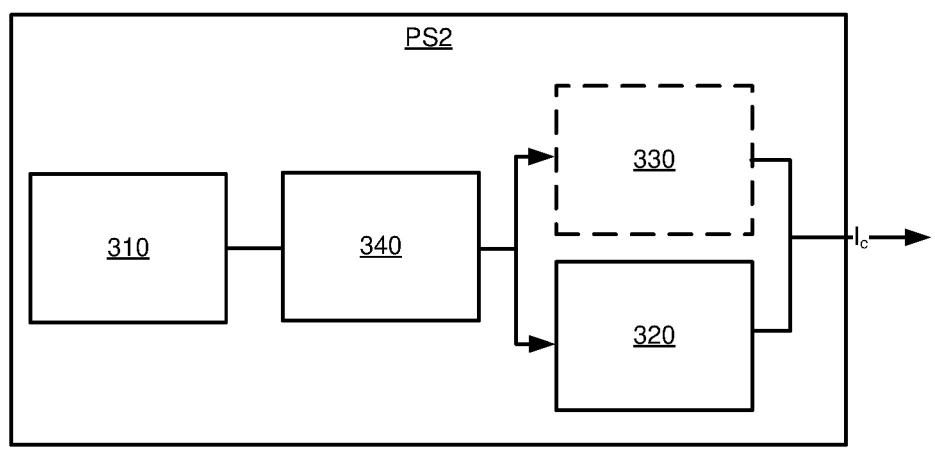
FIG. 13e is a schematic block diagram of the electrical connections of a locking arrangement according to an embodiment.

In FIG. 13e, one embodiment of the power source PS2 is shown wherein an operation detection module 340 is arranged between the power supply 310 and the current generator 320 and the optional rush current generator 330. This embodiment of the power source PS2 may be combined with any of the other embodiments and examples presented herein. The operation detection module 340 is a module arranged to detect if there is manual operation of the patient lift and in turn the locking arrangement 100, 200. This enables the shape memory alloy element 151, 251 to maintain the locking device 151, 251 in its engaged position even if there is power supplied to the power source PS2 and consequently power can be saved since the control current $I_c$ can be turned off when no manual operation of the patient lift is performed. The operation detection module 340 will supply power to the generator(s) 320, 330 of the power source PS2 only when it detects operation of the patient lift. The detection of operation may comprise detecting if e.g. switches operating the patient lift are pressed or a power switch is activated. Alternatively, or in addition, sensors arranged to detect motor activation may be utilized for detecting operation of the patient lift. This may be performed by for example detecting changes in any one of torque or RPM provided by the motor or voltage and current supplied to the motor. Once operation is detected, the operation detection module 340 supplies power to the generator(s) 320, 330 and the control current $I_c$ is provided to the shape memory alloy element 151, 251 in any of the ways described earlier.

In one embodiment of the operation detection module, a timer is configured to be activated and reset each time an operation is detected and power is supplied to the generator(s) 320, 330 until the timer has reached a predefined or configurable hold off value. Once the hold off value has been reached, the operation detection module 340 is configured to stop supplying power to the generator(s) 320, 330 and consequently the control current $I_c$ is turned off. Said timer may be operatively connected to the power supply and/or the separate controller. This is beneficial since in many cases more than one operation will be performed within a limited period of time, e.g. the patient is raised from a bed and shortly thereafter lowered into a wheelchair. Such frequent triggers of the shape memory alloy element 151, 251 will introduce unwanted wear of the system and reduce the lifetime of the locking arrangement 100, 200.

It should be mentioned that the operation detection module 340 may be implemented in hardware, software or in a combination of them both. The operation detection module may also be considered as part of the current generator 320, especially in embodiments where a controller is used in the power supply PS2.

In one embodiment of the operation detection module, the hold off value corresponds to a duration of between 5 and 20 s. This will decrease the stress on the locking arrangement due to limiting rapid switching between the disengaged mode and the engaged mode.

The invention has been described above in detail with reference to embodiments thereof. However, as is readily understood by those skilled in the art, other embodiments are equally possible within the scope of the present invention, as defined by the appended claims.

The invention claimed is:

1. A locking arrangement for a patient lift configured to selectively lock the vertical movement of a patient support mounting device connected to a lifting device of the patient lift via a load bearing member,
the locking arrangement comprising a shape memory alloy element and a locking device, the shape memory alloy element being connected to the locking device and arranged to selectively actuate said locking device to control a locking force on an engagement member mechanically connected to a motor and the load bearing member of the patient lift, the motor being arranged to raise and lower the patient support mounting device, the locking arrangement being configured to operate in:
an engaged mode wherein the shape memory alloy element is in a first configuration and the locking device is in an engaged position in relation to the engagement member for exerting a locking force on the engagement member thereby preventing vertical movement of the patient support mounting device;
a disengaged mode wherein the shape memory alloy element is in a second configuration actuating the locking device to a disengaged position in relation to the engagement member thereby enabling vertical movement of the patient support mounting device
wherein the shape memory alloy element is arranged to be electrically connected to at least one power source for selectively transitioning between the first and second configuration.

2. The locking arrangement according to claim 1, wherein the locking arrangement is arranged to switch from the engaged mode to the disengaged mode by means of the shape memory alloy element transitioning from the first configuration to the second configuration in response to receiving a current provided by said power source exceeding a first configuration threshold current.

3. The locking arrangement according to claim 1, wherein the locking arrangement is arranged to switch from the disengaged mode to the engaged mode by means of the shape memory alloy element transitioning from the second configuration to the first configuration in response to receiving a current provided by the power source subsiding a second configuration threshold current.

4. The locking arrangement according to claim 1, wherein the power source is electrically connected to the motor for driving said motor.

5. The locking arrangement according to claim 1, wherein the shape memory alloy element is a muscle wire.

6. The locking according to claim 1, wherein the locking device is a braking member arranged to selectively provide a braking torque to an output shaft of the patient lift via the engagement member, the output shaft being connected to the motor.

7. The locking arrangement according to claim 6, wherein the engagement member is a friction disc fixated to the output shaft.

8. The locking arrangement according to claim 1, wherein the locking device is biased to exert the locking force onto the engagement member and actuating the locking device to the engaged position when the locking arrangement operates in the engaged mode and the shape memory alloy element is in the first configuration, and whereby the shape memory alloy element is arranged to actuate the locking device to the disengaged position in relation to the engagement member by being in the second configuration when the locking arrangement operates in the disengaged mode.

9. The locking arrangement according to claim 7, wherein the locking device is arranged to be in braking contact with the engagement member while the locking arrangement operates in the engaged mode.

10. The locking arrangement according to claim 1, further comprising a casing arranged to receive the engagement member.

11. The locking arrangement according to claim 10, wherein a first end portion of the locking device is attached to an inner surface of the casing and a second end portion of the locking device is attached to the shape memory alloy element.

12. The locking arrangement according to claim 11, wherein the locking device is arranged to move between the engaged position and the disengaged position in an angle relative a tangent of the engagement member, whereby the locking device in the engaged position forms a tangent to said engagement member and in the disengaged position is arranged to be in an offset angle to said engagement member.

13. The locking arrangement according to claim 8, wherein the locking device is in a resilient material.

14. The locking arrangement according to claim 10, wherein the shape memory alloy element is arranged in a suspension arrangement mounted to the casing, whereby the shape memory alloy element has a first end and second end mounted to the suspension arrangement (180) such that the shape memory alloy element is arranged to at least partially surround the engagement member, the shape memory alloy element having an intermediate portion, arranged to extend inwards towards the engagement member, the intermediate portion (154) being connected to the locking device (155).

15. The locking arrangement according to claim 10, wherein the casing is arranged to receive the motor therein.

16. The locking arrangement according to claim 1, further arranged to mechanically connect the motor and a transmission unit of the patient lift.

17. The locking arrangement according to any claim 16, wherein the locking device is arranged to move between the engaged position and the disengaged position in a direction substantially parallel to the output shaft.

18. The locking arrangement according to claim 17, wherein the shape memory alloy element is arranged parallel to the output shaft.

19. The locking arrangement according to claim 18, whereby a first portion of the shape memory alloy element is attached to an actuated part of the locking device for moving said locking device and a second portion of the shape memory alloy element is fix.

20. The locking arrangement according to claim 17, further comprising a housing for receiving the output shaft and the engagement member, and at least one friction member arranged in the housing in the proximity of the engagement member, whereby the locking device in the engaged position is arranged to cause the at least one friction member and the engagement member to come into contact thereby providing a braking torque to the output shaft.

21. The locking arrangement according to claim 19, wherein the locking device further comprises a biasing part, said biasing part being spring loaded for exerting the locking force onto the engagement member, whereby the biasing part is arranged to engage the actuated part for actuating said locking device to the engaged position when the locking arrangement operates in the engaged mode.

22. The locking arrangement according to claim 20, wherein the biasing part comprises at least one abutment heel arranged to latch onto the actuated part.

23. A patient lift comprising a lifting device, a patient support mounting device and a load bearing member, the patient support mounting device being connected to the lifting device via the load bearing member, the patient lift further comprising a locking arrangement according to claim 1.

24. A patient lift comprising a lifting device, a patient support mounting device and a load bearing member, the patient support mounting device being connected to the lifting device via the load bearing member, the patient lift further comprising a locking arrangement according to claim 16.

25. The locking arrangement according to claim 6, wherein the locking device is arranged to move between the engaged position and the disengaged position in a direction substantially parallel to the output shaft.

\* \* \* \* \*

UNITED STATES PATENT AND TRADEMARK OFFICE
CERTIFICATE OF CORRECTION

PATENT NO. : 12,133,824 B2
APPLICATION NO. : 17/763795
DATED : November 5, 2024
INVENTOR(S) : Olivier Custeau-Boisclair et al.

It is certified that error appears in the above-identified patent and that said Letters Patent is hereby corrected as shown below:

In the Claims

Column 17, Line 42, Claim 1, delete "device" and insert -- device, --

Column 17, Line 66, Claim 6, delete "locking" and insert -- locking arrangement --

Column 18, Line 46, Claim 14, delete "portion," and insert -- portion --

Column 18, Line 54, Claim 17, delete "to any" and insert -- to --

Signed and Sealed this
Twenty-eighth Day of January, 2025

Coke Morgan Stewart
*Acting Director of the United States Patent and Trademark Office*